United States Patent
Yao

(10) Patent No.: US 12,051,813 B2
(45) Date of Patent: Jul. 30, 2024

(54) GAS DIFFUSION LAYER AND METHOD FOR PREPARING SAME

(71) Applicant: General Hydrogen Corp., Ltd., Shenzhen (CN)

(72) Inventor: Keguang Yao, Shenzhen (CN)

(73) Assignee: General Hydrogen Corp., Ltd., Shenzhen (CN)

( * ) Notice: Subject to any disclaimer, the term of this patent is extended or adjusted under 35 U.S.C. 154(b) by 423 days.

(21) Appl. No.: 17/554,323

(22) Filed: Dec. 17, 2021

(65) Prior Publication Data

US 2022/0109161 A1 Apr. 7, 2022

Related U.S. Application Data

(63) Continuation of application No. PCT/CN2021/085687, filed on Apr. 6, 2021.

(30) Foreign Application Priority Data

Dec. 15, 2020 (CN) .......................... 202011472616.0

(51) Int. Cl.
*H01M 4/88* (2006.01)
*H01M 4/86* (2006.01)

(52) U.S. Cl.
CPC ....... *H01M 4/8807* (2013.01); *H01M 4/8605* (2013.01); *H01M 4/8657* (2013.01); *H01M 4/8673* (2013.01); *H01M 4/8885* (2013.01)

(58) Field of Classification Search
CPC ............. H01M 4/8807; H01M 4/8803; H01M 4/8817; H01M 4/8825; H01M 4/8605; H01M 4/8657; H01M 4/8673; H01M 4/8885

See application file for complete search history.

(56) References Cited

U.S. PATENT DOCUMENTS

| 8,778,557 | B2 * | 7/2014 | Ueda ................... | H01M 8/1004 |
| | | | | 429/481 |
| 2003/0194557 | A1 | 10/2003 | Wilde | |
| 2014/0011118 | A1 | 1/2014 | Lee et al. | |
| 2020/0075962 | A1 * | 3/2020 | Shibata ............... | H01M 4/8817 |
| 2021/0184223 | A1 * | 6/2021 | Park ..................... | H01M 8/0239 |

FOREIGN PATENT DOCUMENTS

| CN | 101492895 A | 7/2009 |
| CN | 102119459 A | 7/2011 |
| CN | 103556543 A | 2/2014 |
| CN | 103956505 A | 7/2014 |
| CN | 107086311 A | 8/2017 |
| CN | 110048127 A | 7/2019 |
| CN | 111082072 A | 4/2020 |
| CN | 211980774 U | 11/2020 |
| CN | 112421059 A | 2/2021 |
| EP | 2680352 A2 | 1/2014 |
| JP | 2007005004 A | 1/2007 |
| JP | 2011195374 A | 10/2011 |
| JP | 2016195059 A | 11/2016 |
| WO | 2015146223 A1 | 10/2015 |
| WO | 2018113485 A1 | 6/2018 |

OTHER PUBLICATIONS

Zhijun Hu et al., "Study on micro-porous layer by coating on carbon fiber paper as gas diffusion layer", Journal of Zhejiang University of Science and Technology, vol. 30 No. 3, Jun. 17, 2018, pp. 235-239.

* cited by examiner

*Primary Examiner* — Raymond Alejandro

(57) ABSTRACT

Disclosed are a gas diffusion layer and a method for preparing the same. In the preparation method, a conductive material is fed to a carbon fiber suspension slurry to obtain a carbon fiber substrate. The carbon fiber substrate is processed to obtain a conductive porous substrate. A hydrophobic layer is formed on the conductive porous substrate to obtain a hydrophobic-conductive porous substrate. Then a microporous layer is formed on the hydrophobic-conductive porous substrate to obtain the gas diffusion layer.

9 Claims, 6 Drawing Sheets

GAS DIFFUSION LAYER AND METHOD FOR PREPARING SAME

CROSS-REFERENCE TO RELATED APPLICATIONS

This application is a continuation of International Patent Application PCT/CN2021/085687, filed on Apr. 6, 2021, which claims the benefit of priority from Chinese patent applications No. 202011472616.0, filed on Dec. 15, 2020. The content of the aforementioned application, including any intervening amendments thereto, is incorporated herein by reference.

TECHNICAL FIELD

The present application relates to fuel cells, and more particularly to a gas diffusion layer and a method for preparing the same.

BACKGROUND

In a fuel cell, the gas diffusion layer plays an important role in supporting the catalytic layer, collecting current, transporting reactive gas, and discharging the generated water. The conventional gas diffusion layer includes a carbon fiber substrate and a microporous layer coated thereon. As the gas diffusion layer requires good conductivity, it is necessary to perform a conductive treatment on the carbon fiber substrate. Traditionally, a layer of conductive material is applied to the surface of the carbon fiber substrate to render the carbon fiber substrate conductive. Nevertheless, only the surface of the carbon fiber substrate becomes conductive after the traditional conductive treatment, rather than the entire carbon fiber substrate, thereby affecting the performance of the gas diffusion layer.

SUMMARY

An object of this application is to provide a gas diffusion layer and a method for preparing the same to overcome the defects that the existing conductive treatment can only make the surface of the carbon fiber substrate rather than the entire carbon fiber substrate conductive, failing to ensure that the gas diffusion layer has desirable performance.

Technical solutions of this application are described as follows.

In a first aspect, this disclosure provides a method for preparing a gas diffusion layer, comprising:
feeding a conductive material to a carbon fiber suspension slurry to obtain a carbon fiber substrate;
processing the carbon fiber substrate to obtain a conductive porous substrate;
forming a hydrophobic layer on the conductive porous substrate to obtain a hydrophobic-conductive porous substrate; and
forming a microporous layer on the hydrophobic-conductive porous substrate to obtain the gas diffusion layer.

In some embodiments, the carbon fiber substrate is prepared through steps of:
chopping a carbon fiber to obtain a chopped carbon fiber;
dispersing the chopped carbon fiber to obtain the carbon fiber suspension slurry;
feeding the conductive material to the carbon fiber suspension slurry to obtain a base paper slurry; and
subjecting the base paper slurry to forming to obtain the carbon fiber substrate.

In some embodiments, the carbon fiber suspension slurry is prepared through steps of:
feeding the chopped carbon fiber into a solution to obtain a carbon fiber mixture; and
stirring the carbon fiber mixture at a preset speed for a preset time to obtain the carbon fiber suspension slurry;
wherein the solution comprises a dispersing agent, a defoaming agent and a thickening agent;

In some embodiments, the base paper slurry is prepared through steps of:
heating the carbon fiber suspension slurry to a preset temperature; and
feeding the conductive material, an adhesive and a glue solution to the carbon fiber suspension slurry followed by stirring, dispersing, cooling and stirring to obtain the base paper slurry.

In some embodiments, the step of "subjecting the base paper slurry to forming to obtain the carbon fiber substrate" comprises:
subjecting the base paper slurry to forming by using an inclined wire forming device to obtain a primary carbon fiber substrate; and
subjecting the primary carbon fiber substrate to sizing to obtain the carbon fiber substrate.

In some embodiments, the conductive porous substrate is prepared through steps of:
subjecting the carbon fiber substrate to drying, heating and carbonization to obtain the conductive porous substrate.

In some embodiments, the hydrophobic-conductive porous substrate is prepared through steps of:
impregnating the conductive porous substrate with a water repellent agent followed by drying and sintering to obtain the hydrophobic-conductive porous substrate.

In some embodiments, the step of "forming a microporous layer on the hydrophobic-conductive porous substrate to obtain the gas diffusion layer" comprises:
preparing a microporous layer slurry;
applying the microporous layer slurry on the hydrophobic-conductive porous substrate followed by drying and sintering to obtain the gas diffusion layer.

In some embodiments, the microporous layer slurry is prepared through steps of:
adding a carbon material, a thickening agent and a water repellent agent to a liquid to obtain a porous material mixture; and
subjecting the porous material mixture to stirring and dispersing to obtain the microporous layer slurry.

In a second aspect, this disclosure provides a gas diffusion layer, comprising:
a microporous layer;
a first hydrophobic layer;
a conductive porous substrate; and
a second hydrophobic layer;
wherein the microporous layer, the first hydrophobic layer, the conductive porous substrate and the second hydrophobic layer are layeredly arranged successively from top to bottom; and
the gas diffusion layer has a thickness of 80-300 μm, a tensile strength of 8-30 MPa, a volume resistance of 3-10 mΩ·cm$^2$, a porosity equal to or larger than 35% and a contact angle of 100-150°.

Compared to the prior art, this application has the following beneficial effects.

During the preparation of the carbon fiber substrate, the conductive material is directly added to the carbon fiber suspension slurry such that the conductive material can be evenly distributed at the interior of the carbon fiber substrate, allowing for better bonding between the conductive material and the carbon fiber. As a consequence, the entire carbon fiber substrate becomes conductive, thus improving the performance of the gas diffusion layer. Moreover, compared to the method of coating a conductive material, the method provided herein reduces the time consumption and improves the production efficiency. In addition, in the gas diffusion layer prepared by the method provided herein, the carbon fiber substrate, the hydrophobic layer and the microporous layer are tightly bound such that the gas diffusion layer is not prone to powder falling-off and cracking under a certain pressure, thereby improving the service life of the gas diffusion layer.

BRIEF DESCRIPTION OF THE DRAWINGS

To render the technical solutions of the embodiments of this disclosure or the prior art clearer, the drawings used in the description of the embodiments of this disclosure or the prior art will be briefly described below. Obviously, presented in the following drawings are merely some embodiments of the disclosure. Other drawings can be obtained by those skilled in the art based on the drawings provided herein without paying any creative effort.

Figure 1:
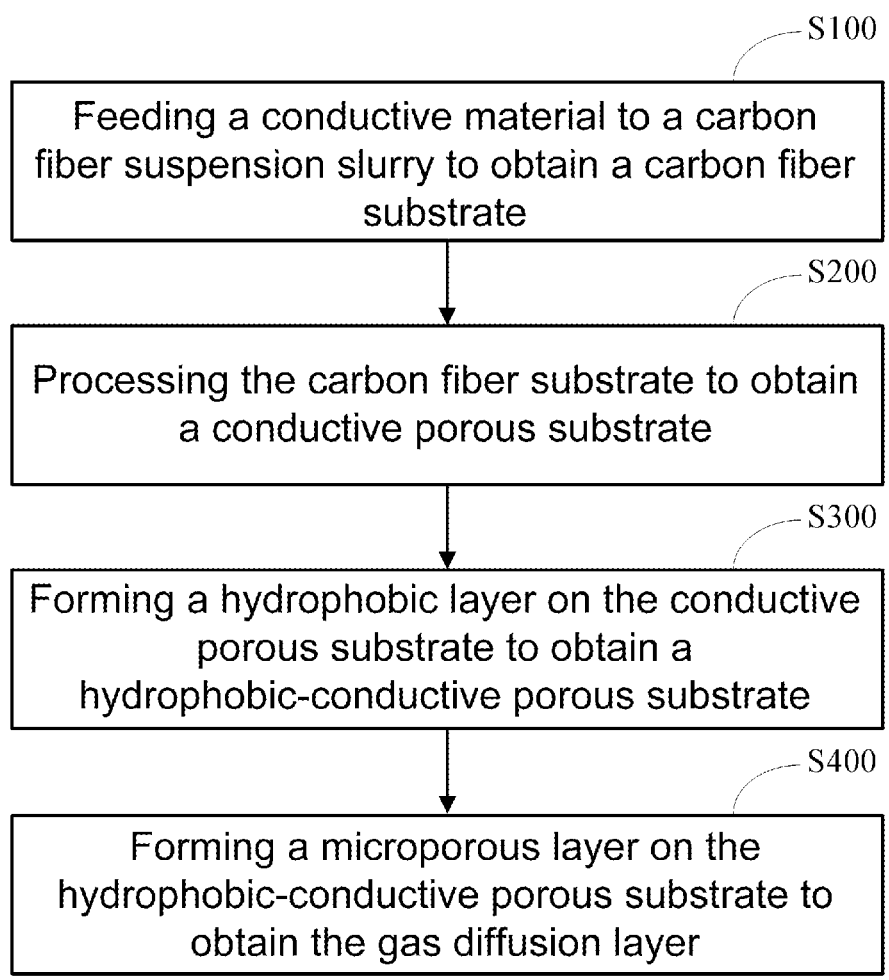
FIG. 1 is a flow chart of a method for preparing a gas diffusion layer according to an embodiment of the present disclosure.

In the drawings, 10, gas diffusion layer; 1, microporous layer; 2, first hydrophobic layer; 3, conductive porous substrate; and 4, second hydrophobic layer.

DETAILED DESCRIPTION OF EMBODIMENTS

The technical solutions of this disclosure will be clearly and completely described below with reference to the drawings of the embodiments. Obviously, the following embodiments are merely some embodiments of the disclosure, and are not intended to limit the disclosure. Any other embodiments made by those skilled in the art based on the embodiments disclosed herein without paying any creative effort should fall within the scope of the disclosure.

It should be noted that as used herein, all directional indications (such as upper, lower, left, right, front, and back) are only used to explain the relative positional relationship and motion situation between the components in a certain specific posture (as shown in the drawings). If the specific posture changes, the directional indication also changes accordingly.

In addition, as used herein, the terms "first" and "second" are merely descriptive and should not be understood to indicate or imply relative importance or the number of the technical features referred to. Thus, a feature defined by "first" and "second" may explicitly or implicitly include at least one of the features. In addition, as used herein, the "and/or" includes three solutions. For example, the "A and/or B" includes A, B, and a combination thereof. Moreover, the technical solutions of the embodiments can be combined on the premise that the combined technical solutions can be implemented by those skilled in the art. If the combination of the technical solutions is contradictory or cannot be implemented, it should be considered that such a combination of the technical solutions does not exist, and does not fall within the protection scope of the present disclosure.

Referring to FIG. 1, a method for preparing a gas diffusion layer is provided, which is described below.

(S100) A conductive material is fed to a carbon fiber suspension slurry to obtain a carbon fiber substrate.

Figure 2:
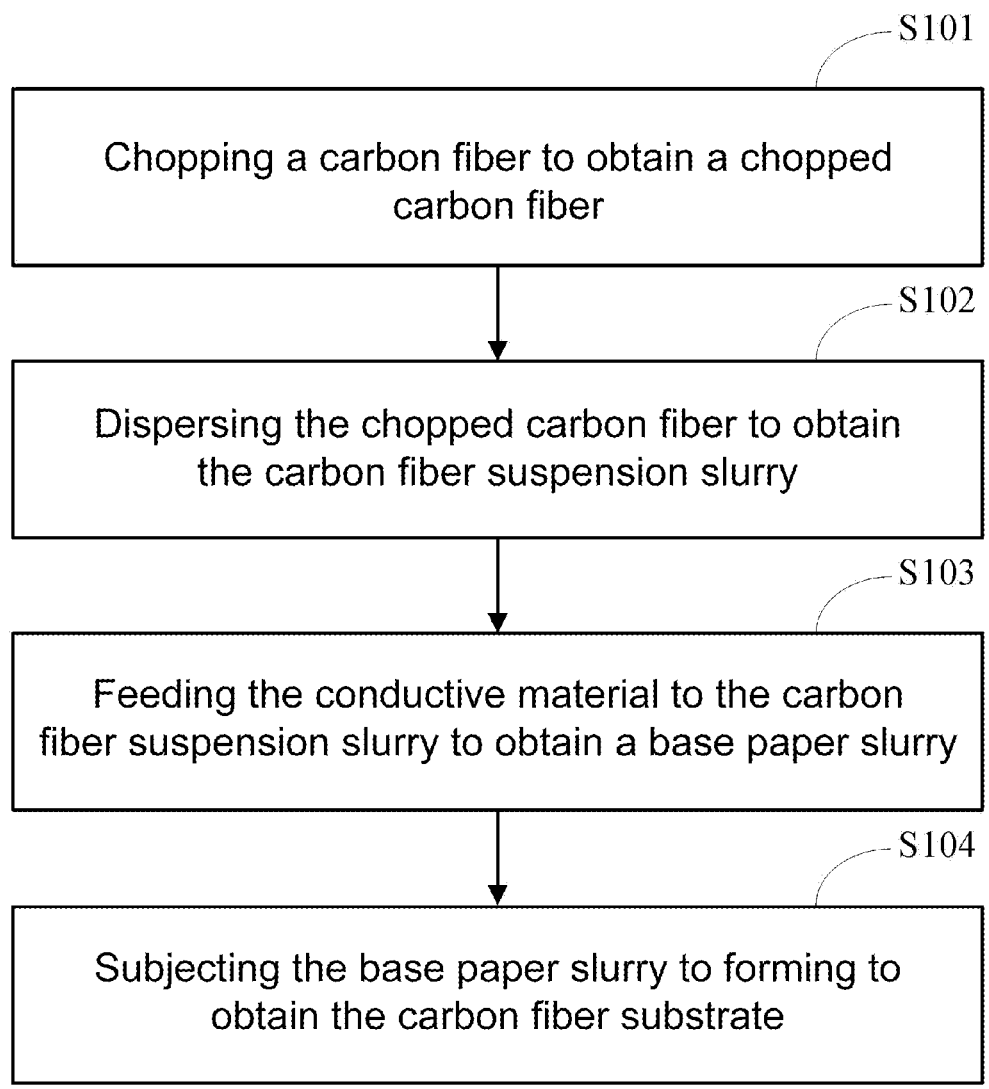
FIG. 2 is a flow chart of a preparation of a carbon fiber substrate according to an embodiment of the present disclosure.

As shown in FIG. 2, the step (S100) is performed through the following steps.

(S101) A carbon fiber is chopped to obtain a chopped carbon fiber.

In some embodiments, the carbon fiber is chopped via a chopping machine to obtain the chopped carbon fiber.

In an embodiment, a length of the chopped carbon fiber is 3 mm-10 mm. If the chopped carbon fiber is too short, the production cost will increase. If the chopped carbon fiber is too long, the dispersion effect will be poor, thereby affecting the performance of the carbon fiber substrate.

(S102) The chopped carbon fiber is dispersed to obtain a carbon fiber suspension slurry.

In some embodiments, the chopped carbon fiber is fed to a solution to obtain a carbon fiber mixture followed by stirring at a preset speed for a preset time to obtain the carbon fiber suspension slurry, where the solution includes a dispersing agent, a defoaming agent and a thickening agent.

In an embodiment, a carbon fiber concentration in the carbon fiber mixture is no more than 0.02%.

(S103) The conductive material is fed to the carbon fiber suspension slurry to obtain a base paper slurry.

In an embodiment, the carbon fiber suspension slurry is heated to a preset temperature such that the solid viscosity in the carbon fiber suspension slurry can be decreased, facilitating the dispersion of the carbon fiber suspension slurry. The heated carbon fiber suspension slurry is added with the conductive material, an adhesive, and a glue solution, stirred, dispersed and cooled to a preset temperature such that the carbon fiber suspension slurry will experience a hydration reaction, facilitating the dispersion of the carbon fiber suspension slurry and ensuring the performance of the carbon fiber substrate. After that, the carbon fiber suspension slurry is stirred for a preset time to obtain the base paper slurry.

(S104) The base paper slurry is subjected to forming to obtain the carbon fiber substrate.

In an embodiment, the base paper slurry is formed using an inclined wire forming device to obtain a primary carbon fiber substrate. The primary carbon fiber substrate is subjected to sizing to obtain the carbon fiber substrate.

In an embodiment, an upper surface of the primary carbon fiber substrate is sized via a sizing machine. By using a suction machine, the glue solution on the upper surface of the primary carbon fiber substrate can better penetrate to a lower surface of the primary carbon fiber substrate such that the glue solution can be uniformly distributed in the primary carbon fiber substrate to facilitate bonding the entire carbon fiber substrate, thus improving the performance of the carbon fiber substrate.

(S200) The carbon fiber substrate is processed to obtain a conductive porous substrate.

Figure 3:
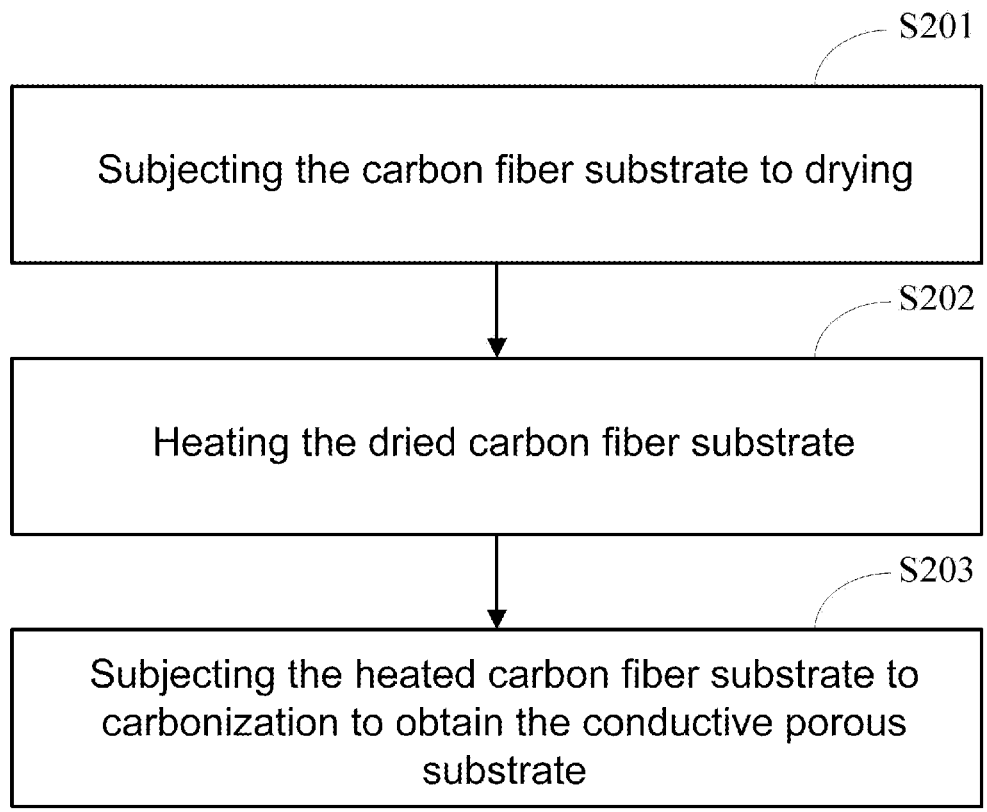
FIG. 3 is a flow chart of a preparation of a conductive porous substrate according to an embodiment of the present disclosure.

As shown in FIG. 3, the step (S200) includes the following steps.

(S201) The carbon fiber substrate is subjected to drying.

In an embodiment, the carbon fiber substrate is dried at 50-150° C. for 1-5 h.

In an embodiment, the carbon fiber substrate is dried at 50-150° C. for 5-30 min. A low drying temperature will increase the time consumption, which will affect the production efficiency of the gas diffusion layer. If the drying temperature is too high, the surface of the carbon fiber substrate is prone to film formation such that the interior of the carbon fiber substrate cannot be dried, which will affect the quality of the gas diffusion layer. If the drying time is too short, the carbon fiber substrate cannot be dried completely, which will affect the performance of the gas diffusion layer. If the drying time is too long, the production efficiency of the gas diffusion layer will be reduced.

(S202) The dried carbon fiber substrate is subjected to sintering.

The dried carbon fiber substrate is subjected to sintering at 200-400° C. under air for 3-30 min.

In an embodiment, the dried carbon fiber substrate is subjected to sintering at 200-400° C. for 3-30 min. A low sintering temperature will cause an incomplete reaction, thereby affecting the performance of the gas diffusion layer. If the sintering is performed at a extremely high temperature, the carbon fiber substrate will undergo combustion. If the sintering time is too short, the reactions of the carbon fiber substrate will be incomplete, thereby affecting the performance of the gas diffusion layer. If the sintering time is too long, the production efficiency of the gas diffusion layer will be reduced.

(S203) The carbon fiber substrate is subjected to high-temperature carbonization to obtain the conductive porous substrate.

The carbon fiber substrate is subjected to carbonization at 1000-2000° C. under a protective gas for 0.2-2 h.

In an embodiment, the carbon fiber substrate is subjected to carbonization at 1000-2000° C. for 0.2-2 h. If the carbonization process is performed at a too low temperature, the reactions of the carbon fiber substrate will be incomplete, which will affect the performance of the gas diffusion layer. If the carbonization process is performed at an excessively high temperature, the power consumption of the carbonization furnace will be aggravated. If the carbonization time is too short, the reactions of the carbon fiber substrate will be incomplete, which will affect the performance of the gas diffusion layer. If the carbonization time is too long, the power consumption of the carbonization furnace will be relatively high.

In an embodiment, the protective gas is nitrogen, argon or helium.

(S300) A hydrophobic layer is formed on the conductive porous substrate to obtain a hydrophobic-conductive porous substrate.

Figure 4:
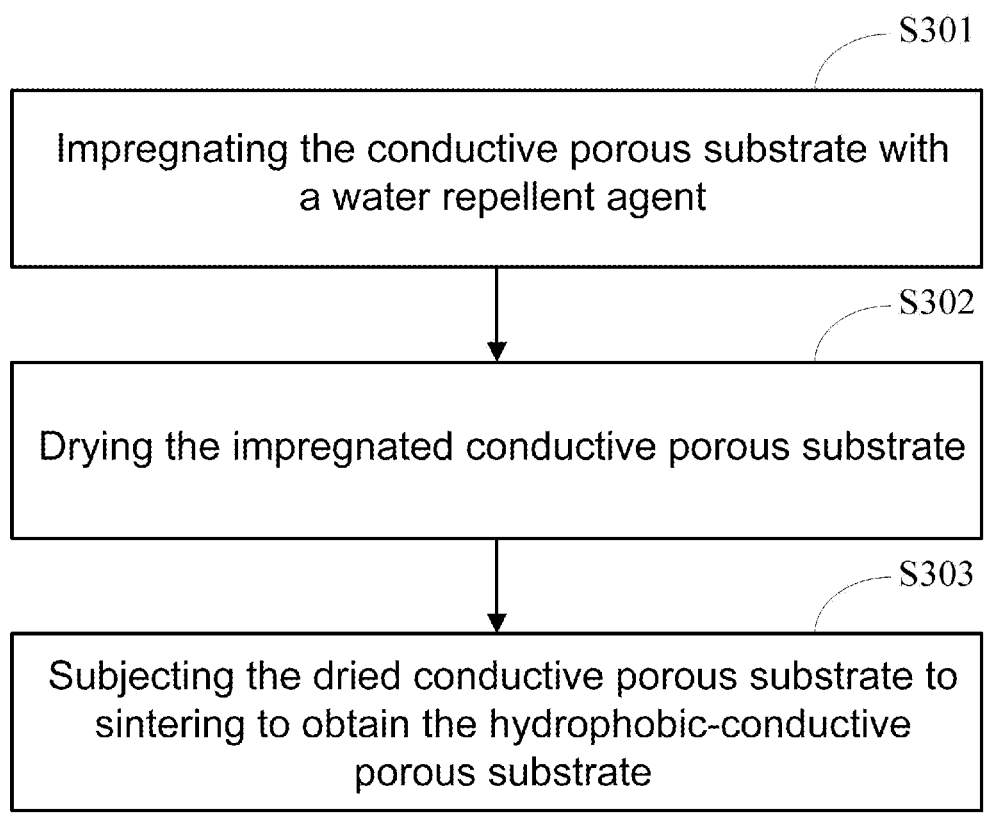
FIG. 4 is a flow chart of a preparation of a hydrophobic-conductive porous substrate according to an embodiment of the present disclosure.

As shown in FIG. 4, the step (S300) includes the following steps.

(S301) The conductive porous substrate is subjected to impregnation with a water repellent agent.

In an embodiment, the conductive porous substrate is processed with the water repellent agent in an immersion tank, a squeezing roller, a drying furnace, and a sintering furnace successively through a winding and unwinding system. The squeezing roller can remove the excess water repellent agent on the conductive porous substrate to control the content of the water repellent agent in the conductive porous substrate to be controlled within a certain range, thereby ensuring the performance of the gas diffusion layer.

In an embodiment, the surface of the conductive porous substrate after passing through the immersion tank does not contact the drying furnace.

The solid content of the water repellent agent is 1%-20%. A relatively low solid content will render the water repellent agent low in viscosity, which makes the binding amount of the water repellent agent low, thereby affecting the performance of the gas diffusion layer. If the solid content is too high, the viscosity of the water repellent agent will become very large, which leads to a large binding amount of the water repellent agent larger, thereby affecting the performance of the gas diffusion layer.

(S302) The impregnated conductive porous substrate is dried.

(S303) The dried conductive porous substrate is subjected to sintering to obtain a hydrophobic-conductive porous substrate.

(S400) A microporous layer is formed on the hydrophobic-conductive porous substrate to obtain the gas diffusion layer.

Figure 5:
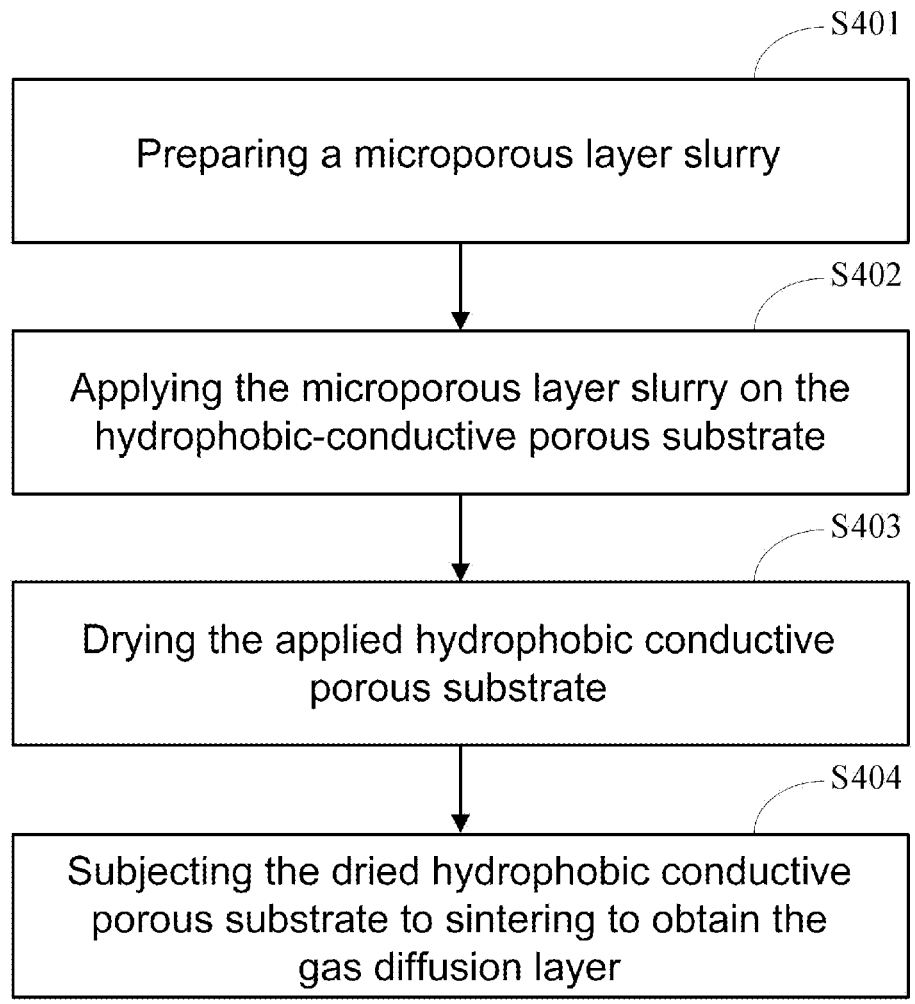
FIG. 5 is a flow chart of a preparation of the gas diffusion layer according to an embodiment of the present disclosure.

As shown in FIG. 5, the step (S400) specifically includes the following steps.

(S401) A microporous layer slurry is prepared.

In an embodiment, a carbon material, a thickening agent, and a water repellent agent are added to a liquid to obtain a porous material mixture. The porous material mixture is stirred and dispersing to obtain a microporous layer slurry. In this manner, the microporous layer slurry can be applied on the hydrophobic-conductive porous substrate evenly, so that the microporous layer and a proton exchange membrane can be closely attached, which can reduce the contact resistance between the microporous layer and the proton exchange membrane, thereby enhancing the performance of the fuel cell.

The solid content of the microporous layer slurry is 5%-25%. A relatively low solid content will render the microporous layer slurry low in viscosity, resulting in a low binding amount of the microporous layer slurry, thereby affecting the performance of the gas diffusion layer. If the solid content of the microporous layer slurry is too high, the viscosity of the microporous layer slurry will be relatively high, resulting in a high binding amount of the microporous layer slurry, thereby affecting the performance of the gas diffusion layer.

(S402) The microporous layer slurry is applied on the hydrophobic conductive porous substrate.

In an embodiment, the microporous layer slurry is applied on the hydrophobic conductive porous substrate by blade coating, ultrasonic spraying, screen printing, dipping and transferring, chemical vapor deposition, physical vapor deposition, or a combination thereof.

(S403) The applied hydrophobic-conductive porous substrate is subjected to drying.

(S404) The dried hydrophobic conductive porous substrate is subjected to sintering to obtain the gas diffusion layer.

In an embodiment, the hydrophobic conductive porous substrate is processed by the drying furnace and the sintering furnace sequentially through the winding and unwinding system.

In an embodiment, the coating surface of the hydrophobic-conductive porous base does not contact the drying furnace and the sintering furnace.

During the preparation of the carbon fiber substrate, the conductive material is directly added to the carbon fiber suspension slurry such that the conductive material can be evenly distributed at the interior of the carbon fiber substrate, allowing for better bonding between the conductive material and the carbon fiber. As a consequence, the entire carbon fiber substrate becomes conductive, thus improving the performance of the gas diffusion layer. Moreover, compared to the method of coating a conductive material, the method provided herein reduces the time consumption and improves the production efficiency. In addition, in the gas diffusion layer prepared by the method provided herein, the carbon fiber substrate, the hydrophobic layer and the microporous layer are tightly bound such that the gas diffusion layer is not prone to powder falling-off and cracking under a certain pressure, thereby improving the service life of the gas diffusion layer.

The carbon fiber is carbon fiber T300 or T700 with good conductivity.

The glue solution is selected from the group consisting of starch, modified starch, animal glue, modified cellulose, chitosan, and modified products thereof, polyvinyl alcohol, polyacrylamide, alkyl ketene dimer, polyurethane, benzene ethylene-maleic anhydride, styrene-acrylic copolymer, and styrene acrylate polymer.

The conductive material includes, but is not limited to, graphene, graphite, carbon nanotubes, and carbon powder.

The thickening agent includes, but is not limited to, hydroxypropyl methylcellulose, sodium carboxymethyl cellulose, hydroxyethylcellulose, methylcellulose, polyvinyl alcohol, and polyacrylamide.

The adhesive includes, but is not limited to, epoxy resin, phenolic resin, acrylic resin, polyvinylpyrrolidone, polyurethane, and hot melt adhesive containing ethylene polymer.

The hydrophobic agent includes, but is not limited to, polytetrafluoroethylene, tetrafluoroethylene-hexafluoropropylene copolymer, polyvinylidene fluoride, and polysilazane resin.

Figure 6:
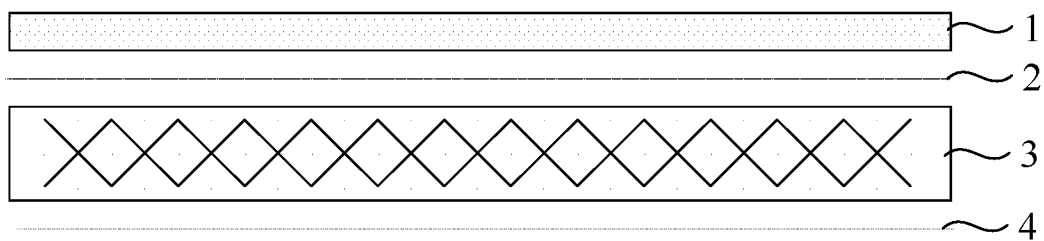
FIG. 6 schematically shows a structure of the gas diffusion layer according to an embodiment of the present disclosure.

Referring to an embodiment shown in FIG. 6, a gas diffusion layer 10 is provided, which includes a microporous layer 1, a first hydrophobic layer 2, a conductive porous substrate 3, and a second hydrophobic layer 4. The microporous layer 1, the first hydrophobic layer 2, the conductive porous substrate 3 and the second hydrophobic layer 4 are layeredly arranged successively from top to bottom. The gas diffusion layer has a thickness of 80-300 μm, a tensile strength of 8-30 MPa, a volume resistance of 3-10 mΩ·cm², a porosity equal to or larger than 35% and a contact angle of 100-150°.

The present disclosure will be further described in detail below.

Example 1

10 kg of carbon fiber T300 or T700 was subjected to chopping to obtain a chopped carbon fiber with a length of 6 mm. The chopped carbon fiber passed through a bin to automatically enter a dispersion tank, followed by being added with water, a dispersing agent, a defoaming agent, and a thickening agent to obtain a carbon fiber mixture, where the carbon fiber concentration in the carbon fiber mixture was no more than 0.02%. The carbon fiber mixture in the dispersion tank was stirred at a speed of 100 rpm for 1 h, so that the chopped carbon fibers in the carbon fiber mixture could be completely dispersed into single carbon fibers to obtain a carbon fiber suspension slurry. Then the carbon fiber suspension slurry was heated to 80-90° C. 12-18 kg of the heated carbon fiber suspension slurry was added with a mixture including 1.3-2.3 kg of carbon powder, 1-2 kg of epoxy resin, and 1-2 kg of modified substance, followed by stirring at a speed of 1000 rpm for 1 h, dispersing at a speed of 4000 rpm for 3 h, and cooling to 25° C. After that, the carbon fiber suspension slurry was stirred at a speed of 300 rpm for 1 h to obtain a base paper slurry. The base paper slurry was pumped to an inclined wire forming device to make the primary carbon fiber substrate uniform, where the inclined wire forming device included a 40-mesh forming mesh belt. The primary carbon fiber substrate was subjected to sizing to obtain the carbon fiber substrate, where the sizing process included an upper sizing process and a lower suction process. The carbon fiber substrate was processed by a drying furnace, a sintering furnace and a carbonization furnace successively through a winding and unwinding system to obtain a conductive porous substrate, where a drying process in the drying furnace was performed at 70° C. for 5-20 min; a sintering process in the sintering furnace was performed at 360° C. for 5-30 min; and a carbonization process in the carbonization furnace was performed at 2000° C. for 20-50 min. The conductive porous substrate was processed by an immersion tank, a drying furnace and a sintering furnace successively through the unwinding and unwinding system to obtain a hydrophobic-conductive porous substrate, where an immersion solution in the immersion tank was 2-15% polytetrafluoroethylene dispersion solution; a drying process in the drying furnace was performed at 70° C. for 5-20 min; and a sintering process in the sintering furnace was performed at 360° C. for 5-30 min.

13-19 kg of water was added with a mixture consisting of 1-2 kg of carbon black, 0.2-1 kg of polytetrafluoroethylene suspension and 0.1-0.6 kg of cellulose to obtain a carbon black mixture. The carbon black mixture was stirred at 2000 rpm for 1 h, and dispersed at a speed of 4000 rpm for 3 h to obtain a microporous layer slurry. By adjusting the thickness of the coating head of the coating machine, the microporous layer slurry could be uniformly coated on a surface of the hydrophobic-conductive porous substrate, where the thickness of the microporous layer slurry was 20-200 m.

The coated hydrophobic conductive porous substrate was processed by a drying furnace and a sintering furnace successively through the winding and unwinding system, where a drying process in the drying furnace was performed at 80° C. for 5-20 min; and a sintering process in the sintering furnace at 365° C. for 10-60 min. The coated surface of the hydrophobic conductive porous substrate did not contact the drying furnace and the sintering furnace.

The contact angle between the gas diffusion layer and water was 150°. The gas diffusion layer had a volume resistance of 5.5 mΩ·cm² under a pressure of 0.6 MPa, and a tensile strength of 13 MPa.

Described above are merely preferred embodiments of the application, and are not intended to limit the application. It should be noted that any changes, replacements and modifications made by those skilled in the art without departing from the spirit of the disclosure should fall within the scope of this application defined by the appended claims.

What is claimed is:

1. A method for preparing a gas diffusion layer, comprising:

feeding a conductive material to a carbon fiber suspension slurry to obtain a carbon fiber substrate, wherein the carbon fiber suspension slurry is prepared through steps of:

chopping a carbon fiber to obtain a chopped carbon fiber;

feeding the chopped carbon fiber to a solution to obtain a carbon fiber mixture, wherein the solution comprises a dispersing agent, a defoaming agent and a thickening agent; and stirring the carbon fiber mixture at a preset speed for a preset time to obtain the carbon fiber suspension slurry;

wherein the method further comprises:

processing the carbon fiber substrate to obtain a conductive porous substrate;

forming a hydrophobic layer on the conductive porous substrate to obtain a hydrophobic-conductive porous substrate; and forming a microporous layer on the hydrophobic-conductive porous substrate to obtain the gas diffusion layer.

2. The method of claim 1, wherein the carbon fiber substrate is prepared through steps of:

feeding the conductive material to the carbon fiber suspension slurry to obtain a base paper slurry; and subjecting the base paper slurry to forming to obtain the carbon fiber substrate.

3. The method of claim 2, wherein the base paper slurry is prepared through steps of:

heating the carbon fiber suspension slurry to a preset temperature; and feeding the conductive material, an adhesive and a glue solution to the carbon fiber suspension slurry followed by stirring and dispersing at a first preset speed for a first preset time, cooling to a preset temperature, and stirring at a second preset speed for a second preset time to obtain the base paper slurry.

4. The method of claim 2, wherein the step of subjecting the base paper slurry to forming to obtain the carbon fiber substrate comprises:

subjecting the base paper slurry to forming by using an inclined wire forming device to obtain a primary carbon fiber substrate; and subjecting the primary carbon fiber substrate to sizing to obtain the carbon fiber substrate.

5. The method of claim 1, wherein the conductive porous substrate is prepared through steps of:

subjecting the carbon fiber substrate to drying, heating and carbonization to obtain the conductive porous substrate.

6. The method of claim 1, wherein the hydrophobic-conductive porous substrate is prepared through steps of:

impregnating the conductive porous substrate with a water repellent agent followed by drying and sintering to obtain the hydrophobic-conductive porous substrate.

7. The method of claim 1, wherein the step of forming a microporous layer on the hydrophobic-conductive porous substrate to obtain the gas diffusion layer comprises:

preparing a microporous layer slurry; and applying the microporous layer slurry on the hydrophobic-conductive porous substrate followed by drying and sintering to obtain the gas diffusion layer.

8. The method of claim 7, wherein the microporous layer slurry is prepared through steps of:

adding a carbon material, a thickening agent and a water repellent agent to a liquid to obtain a porous material mixture; and subjecting the porous material mixture to stirring and dispersing at a preset speed for a preset time to obtain the microporous layer slurry.

9. A gas diffusion layer prepared by the method of claim 1, comprising:

a microporous layer;

a first hydrophobic layer;

a conductive porous substrate; and a second hydrophobic layer;

wherein the microporous layer, the first hydrophobic layer, the conductive porous substrate and the second hydrophobic layer are layeredly arranged successively from top to bottom; and the gas diffusion layer has a thickness of 80-300 μm, a tensile strength of 8-30 MPa, a volume resistance of 3-10 mΩ·cm$^2$, a porosity equal to or larger than 35% and a contact angle of 100-150°.

* * * * *